Figure 1:
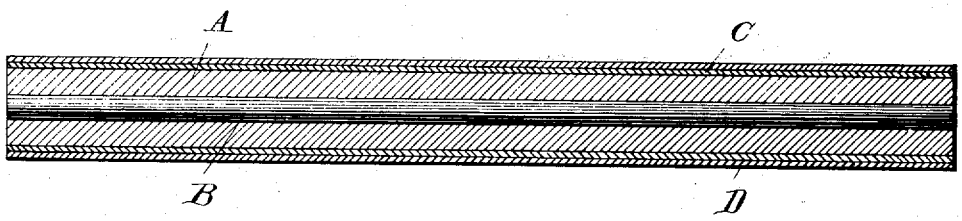

B. B. GOLDSMITH.

LEAD PENCIL OR OTHER ARTICLE OF FIBROUS MATERIAL.

No. 11,259. Reissued Aug. 16, 1892.

Witnesses:
J. B. McGirr.
F. T. Chapman

Inventor,
Byron B. Goldsmith,
By Joseph Lyons.
Attorney

UNITED STATES PATENT OFFICE.

BYRON B. GOLDSMITH, OF NEW YORK, N. Y.

LEAD-PENCIL OR OTHER ARTICLE OF FIBROUS MATERIAL.

SPECIFICATION forming part of Reissued Letters Patent No. 11,259, dated August 16, 1892.

Original No. 447,310, dated March 3, 1891. Application for reissue filed May 17, 1892. Serial No. 433,339.

*To all whom it may concern:*

Be it known that I, BYRON B. GOLDSMITH, a citizen of the United States, and a resident of New York, in the county and State of New York, have invented certain new and useful Improvements in Lead-Pencils and other Articles Made of Wood or of other Fibrous Absorbent Material, of which the following is a specification.

My invention has reference to improvements in lead-pencils, pencil and pen holders, and other articles which are made either of wood or of other fibrous absorbent material or the surfaces of which are of such material; and it consists, broadly speaking, in a lead-pencil or other wooden article upon the surface of which is produced a coating of pyroxyline and in addition thereto a superimposed coating of ordinary varnish.

I have found that pyroxyline in solution when applied as a varnish to wooden or other fibrous surfaces does not, like ordinary varnishes, raise the fiber of the wood, but keeps that surface as even and smooth as it was before the pyroxyline was applied. I have also found that by reason of the fact that the pyroxyline varnish does not raise the fiber of the wood and does not sink into the wood, but remains as a skin upon the same, the natural color of the wood is not perceptibly changed by the application of such varnish. In consequence thereof a pyroxyline varnish applied to wooden or other fibrous absorbent articles is capable of receiving a high polish, for in the act of polishing no wood fibers are torn off from the surface to expose minute spots of the bare wood or other absorbent material, as is the case with all other varnishes which raise the fiber of the wood, as is well known. Thus in coating the wood of a lead-pencil or pencil or pen holder with pyroxyline varnish and then polishing the latter the surface thus treated receives a high metallic luster. Other wooden articles similarly treated behave in the same manner. By preference, however, and in accordance with my invention I do not rely for the luster upon the pyroxyline varnish, but produce such luster or gloss by any ordinary gloss-giving varnish, which I apply to the pyroxyline surface whether the same has been polished or not. This ordinary gloss-giving varnish, not being in contact with the wood or other absorbent surface, does not raise the fiber of the same, but flows upon the pyroxyline surface as smoothly and evenly as upon metal and imparts to the article an exceedingly high and uniform gloss.

On account of the pyroxyline base, which prevents the sinking into the wood of the gloss-varnish, the latter may be applied in a very thin layer, which dries very rapidly, or a number of layers of gloss-varnish may be applied. Similarly a number of successive layers of pyroxyline varnish may be applied.

Upon the ordinary gloss-varnish superimposed upon pyroxyline the article may be stamped, in gold or other letters, with the name of the maker, or with descriptive words, or with ornamental designs, in the same manner in which this is ordinarily done. Lead-pencils and other articles having a wooden surface thus prepared are smooth and pleasant to the touch and retain their high gloss an indefinite time and are in this respect more durable than like articles of ordinary manufacture.

I have also found that the pyroxyline varnish is not perceptibly affected chemically by the oils contained in the wood as ordinary varnishes are. The exudation of such oils to the surface and the consequent deterioration of the varnish and the destruction of gloss are thus prevented. This is particularly useful in the case of cedar-wood, which contains an etheric oil which readily combines with some gloss-giving varnishes, especially with resin varnishes, while it is practically indifferent to pyroxyline. My invention is therefore particularly useful when applied to lead-pencils, which are universally made with a mantle of cedar-wood.

By the term "pyroxyline varnish" I mean to comprise all varnishes containing pyroxyline in sufficient quantities to have the effect to lay down the fiber of wood or of other fibrous absorbent material whatever the other constituents of the varnish may be. Celluloid varnish, therefore, is one of the species of pyroxyline varnish which I may use; but I am not confined to any particular species, and I may use pyroxyline in solution without any admixture.

To still further ornament the surfaces of wooden articles—as, for instance, lead-pencils—the pyroxyline varnish is colored or tinted with a suitable pigment, and preferably with an aniline color, which rapidly diffuses in pyroxyline varnish; or I may color the article after the pyroxyline has been applied by momentarily dipping it into an aniline dye. My improved wooden or other fibrous article therefore has upon its surface an exceedingly thin coat or coats of pyroxyline varnish, either colorless or tinted, and in addition thereto a thin coat or coats of ordinary gloss-varnish, it being understood that the coat of pyroxyline may be polished and that the ordinary varnish coat may also be polished.

In the accompanying drawings, which form a part of this specification, I have illustrated, as far as practicable, a specimen of my improved article of manufacture, which, for the sake of simplicity, is exemplified by a lead-pencil.

Figure 2:
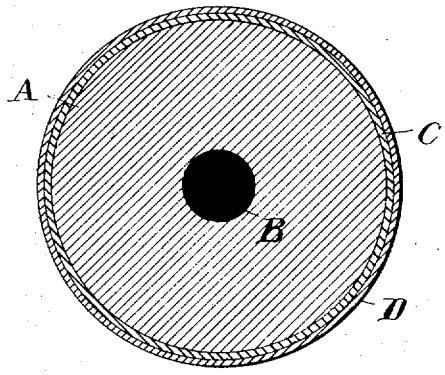

Figure 1 represents a longitudinal section of a lead-pencil with my improvement applied thereto, but showing the coatings upon the wood of the lead-pencil greatly exaggerated; and Fig. 2 represents a cross-section of the improved lead-pencil upon a still larger scale and the coatings of the wood also exaggerated.

A represents the wooden body of the lead-pencil with the graphite or graphite compound B in the center. The very thin coating of pyroxyline upon the surface of the wood is represented by appropriate shading, and is marked by the reference-letter C. This coating, as has been stated above, is applied to the wood in a fluid state, either tinted or colorless, or it may be tinted after application by momentarily immersing the lead-pencil in a suitable bath, and D represents the coating of ordinary varnish applied upon the pyroxyline surface.

Having now fully described my invention, I claim and desire to secure by Letters Patent—

1. As an improved manufacture, an article having a wooden or other fibrous absorbent surface provided with a coat or coats of pyroxyline varnish and a superimposed coat or coats of ordinary gloss-varnish, substantially as described.

2. As an improved manufacture, an article of wood or of other fibrous absorbent material provided with a tinted coat or coats of pyroxyline varnish and a superimposed coat or coats of ordinary varnish, substantially as described.

3. As an improved manufacture, an article of wood or of other fibrous absorbent material having a polished and tinted coat or coats of pyroxyline varnish upon its exposed surface and a superimposed coat or coats of ordinary varnish upon the pyroxyline, substantially as described.

4. As an improved manufacture, an article of wood or of other fibrous absorbent material having a polished coat or coats of pyroxyline upon its exposed surface and a polished coat or coats of ordinary varnish upon the pyroxyline, substantially as described.

5. As an article of manufacture, a lead-pencil having a coat of pyroxyline upon its exposed surface and a coat of ordinary varnish upon the pyroxyline, substantially as described.

6. As an article of manufacture, a lead-pencil having a tinted coat of pyroxyline upon its exposed surface and a protective coating of ordinary varnish upon the pyroxyline, substantially as described.

7. As an article of manufacture, a lead-pencil having a polished and tinted coat of pyroxyline upon its exposed surface and a protective coating of ordinary varnish upon the pyroxyline, substantially as described.

8. As an article of manufacture, a lead-pencil having a polished coat of pyroxyline upon its exposed surface and a polished coating of ordinary varnish upon the pyroxyline, substantially as described.

In testimony whereof I have signed my name to this specification in the presence of two subscribing witnesses.

BYRON R. GOLDSMITH.

Witnesses:

F. SPIEGELBERG,

TERESE F. GOLDSMITH.